W. H. PRINZ.
MALT HOUSE.
APPLICATION FILED JUNE 14, 1906.

No. 905,225.

Patented Dec. 1, 1908.
3 SHEETS—SHEET 1.

Fig. 1.

Witnesses:
J. B. Weir
Jno. H. Nelson

Inventor:
William H. Prinz,
by Bond, Adams, Pickard & Jackson,
his Attys.

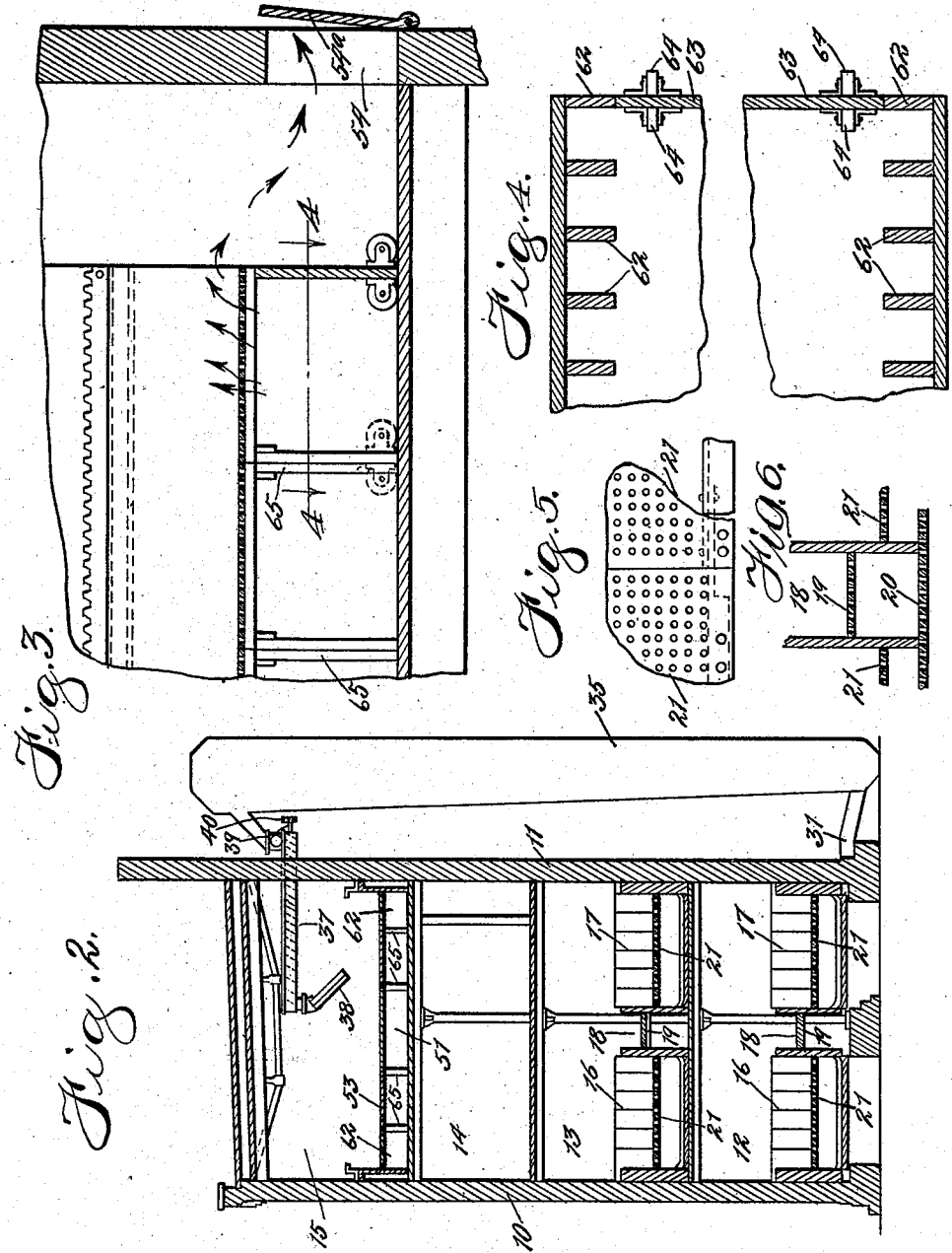

W. H. PRINZ.
MALT HOUSE.
APPLICATION FILED JUNE 14, 1906.
905,225.
Patented Dec. 1, 1908.
3 SHEETS—SHEET 3.
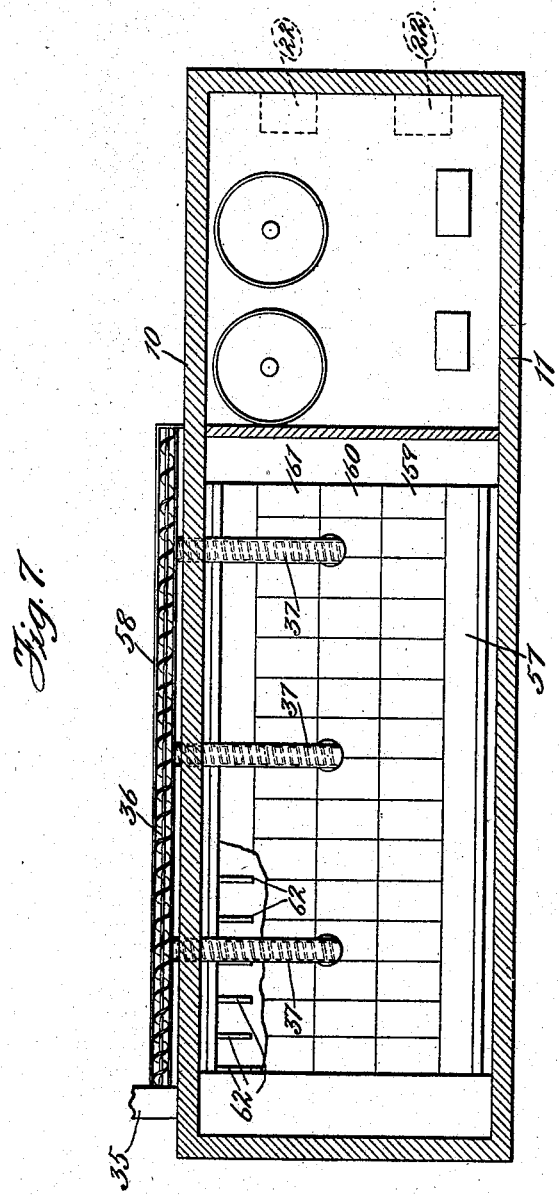

UNITED STATES PATENT OFFICE.

WILLIAM H. PRINZ, OF OAK PARK, ILLINOIS, ASSIGNOR TO SALADIN PNEUMATIC MALTING CONSTRUCTION COMPANY, OF CHICAGO, ILLINOIS, A CORPORATION OF ILLINOIS.

MALT-HOUSE.

No. 905,225.      Specification of Letters Patent.      Patented Dec. 1, 1908.

Application filed June 14, 1906. Serial No. 321,715.

*To all whom it may concern:*

Be it known that I, WILLIAM H. PRINZ, a citizen of the United States, residing at Oak Park, in the county of Cook and State of Illinois, have invented certain new and useful Improvements in Malt-Houses, of which the following is a specification, reference being had to the accompanying drawings.

My invention relates to the treatment of grain for the production of malt, and has particularly to do with apparatus of the type illustrated and described in my application filed June 11th, 1906, in which provision is made for keeping green malt in a perfectly fresh condition and for removing from the mass any desired amount of malt without interrupting the ventilating operation. As explained in the specification of my said application, the green malt is kept fresh, and further growth prevented, by ventilating it by the use of air the moisture of which is less than that required for further growth,—this being accomplished by the use of what I have termed a "withering kiln," in which the malt is placed after germination has been carried to the proper point. In order to permit of the removal of instalments of malt from the kiln from time to time the perforated floor of the compartment in which the malt is placed is made in removable sections, and an adjustable partition or head is provided which closes the end of the air channel or duct beneath the compartment floor, said partition being advanced as each section or series of sections of the floor is removed so as to constantly close the end of said channel, and thus ventilation may continue without substantial interruption. These features are also included, generically speaking, in the apparatus of my present application, which differs from the subject-matter of my pending application principally in two respects. The first has to do with the course of the air in ventilating the malt in the withering kiln. In the apparatus of my pending application the air passes downward through the malt and thence out to the exhaust chamber. In the construction of my present application the flow of air is reversed, the air passing upward through the malt and thence out. I also provide means by which the withering kiln may be supplied either with external or atmospheric air alone, or with air from the attemperator room alone, or with a mixture of air from both sources.

The other novel feature of my present application consists in the arrangement and devices provided for closing the end of the channel under the floor of the compartment in the withering kiln. In my pending application said channel is closed by a hinged or folding partition which extends entirely across the space beneath the compartment floor. In the apparatus of my present application I employ a comparatively short partition, which is preferably rigid from end to end and which does not extend beneath the marginal stationary sections of the compartment floor, so that it is more easily handled. Moreover, I provide short stationary transverse supports or partition extensions beneath the stationary lateral sections of the compartment floor which provide a substantial support and coöperate with the partition to close the end of the air channel as the partition is advanced from point to point.

In other respects the construction shown in my present application is substantially the same as in my pending application, since I employ one or more—preferably two—malting floors containing the usual germinating compartments, which are ventilated in the same manner as in my pending application, receiving air from the attemperator room which also supplies air to the withering kiln. Similar conveyer mechanism is also provided for delivering the malt from the compartment rooms to the withering kiln.

In the accompanying drawings,—Figure 1 is a longitudinal vertical section of the building illustrating my invention; Fig. 2 is a vertical cross-section thereof, looking to the left; Fig. 3 is an enlarged detail, partly in section, illustrating the construction of the malting compartment in the withering kiln; Fig. 4 is a partial horizontal section on line 4—4 of Fig. 3; Fig. 5 is a detail of the floor of the withering kiln; Fig. 6 is an enlarged sectional detail taken on line 6—6 of Fig. 1; and Fig. 7 is a view illustrating the floor plan of the withering kiln compartment with adjacent parts.

Referring to the drawings,—8—9 indicate the end walls, and 10—11 the side walls of the building, which may be of any suitable shape.

12—13 indicate the compartment floors, 14 the attemperator floor, and 15 the withering kiln,—which are preferably arranged in the order shown, the withering kiln being at the top of the building. Obviously, any number of malting floors may be provided, and any number of malting compartments may be provided. In the construction illustrated I have shown each malting floor as having two malting compartments 16—17 between which is a gangway 18 and a floor 19.

As shown in Fig. 6, the floor 19 of the upper gangway 18 is perforated in part as is also the floor 20 beneath said floor 19 so that air may pass through the perforated portions of said floors 19—20 to the lower compartment room. Thus air from the upper compartment room is supplied to the lower room. A part only of the floors 19—20 is perforated as sufficient capacity can be secured without perforating the entire floor.

21 indicates the perforated floors of the various malting compartments.

22 indicates vertical flues, into which air passing through the perforated floors of the malting compartment is discharged through air channels 23 under the compartment floors. Valves 24 are provided for regulating the area of the outlet passages. The flues 22 discharge into an exhaust chamber 25 provided with a fan 26 by which the flow of air is maintained.

27 indicates malt turners for agitating the grain in the malting compartments. Said turners are of the usual well-known type.

28—29 indicate gangways adjacent to the wall 8, which extend transversely of the malting compartment rooms, as shown in Fig. 1.

30 indicates a passage in the floor of the gangway 28 through which the malt from the lower compartments may be delivered to a transverse conveyer 31. Similarly, 32 indicates a passageway in the floor of the upper gangway 29 through which the malt from the upper compartment room may be delivered to the gangway 28 and thence to the conveyer 31. The openings 30—32 are normally closed by covers 33—34, respectively. As indicated in Fig. 2, the conveyer 31 communicates with an elevator 35 which elevates the malt and discharges it into a longitudinally-extending conveyer 36, shown in Fig. 2, which in turn delivers it to transverse conveyers 37 which extend into the withering kiln 15, as shown in Figs. 2 and 7. Said conveyers 37 are provided with adjustable spouts 38, as shown in Fig. 2, by which the malt may be properly distributed. The elevator 35 and conveyers 36—37 are driven preferably by means of a shaft 39 and a sprocket wheel 40, power being supplied from any source, but they may be driven in any other suitable way.

As best shown in Fig. 1, the attemperator room 14 is provided with one or more passages 41 through which air may pass into the upper compartment room 13. Air is admitted to the attemperator room through valved openings 42, or in any other suitable way. 43 indicates heaters which are preferably provided opposite the opening 42 so that when necessary the incoming air may be properly heated. 44 indicates attemperators of the usual type, in which the air is properly moistened or cooled, or both. 45 indicates a passageway controlled by a valve 46 through which air is admitted from the attemperator room 14 to a mixing chamber 47 communicating with the withering kiln 15. 48 indicates an opening adapted to admit external or atmospheric air to the mixing chamber 47. 49 indicates heaters for heating air entering through the opening 48. 50 indicates a valve for controlling the admission of air from the opening 48 to the mixing chamber 47. As best shown in Fig. 1, the mixing chamber 47 communicates with an air channel 51 beneath the perforated floor 52 of the malt compartment 53 of the withering kiln, so that air from the attemperator room, atmospheric air, or both, may be admitted to the channel 51 and thence may rise through the malt into the kiln compartment. 54 indicates a passageway, having a valve 54ª, through which air from the kiln compartment may pass to an exhaust room 55 provided with a fan 56 for discharging the foul air received from the kiln.

The construction of the kiln compartment is best shown in Figs. 2, 3 and 4. As shown in Figs. 1 and 2, the floor of the kiln compartment is made up of two stationary marginal sections 57—58, respectively, which are perforated to permit of the passage of air through them. Between said marginal floor sections are removable intermediate sections 59—60—61. The removable portion of the floor of the kiln compartment is made up of a plurality of removable sections, or series of sections, the arrangement being such that by removing a section or transverse series of sections the length of the floor may be reduced from time to time to offset the removal of a corresponding quantity of malt. I prefer to arrange the sections in transverse series of three, but this is not essential. 62 indicates a series of stationary transverse partitions placed so as to aline with the edges of the intermediate floor sections 59—60—61 and support the same. 63 indicates a movable partition which is adapted to aline with the opposite stationary partitions 62 against the edges of which its ends abut, as shown in Fig. 4. The movable partition 63 is provided with rollers 64 on which it runs. The arrangement is such that as each successive series of removable floor sections is removed the removable partition 63 may be advanced to the next pair of stationary partitions, and as such movable partition coöperates with the stationary partitions to entirely close the channel under the compartment floor it is apparent that ventilation of the malt in the kiln compartment may be continued substantially without interruption, notwithstanding the removal of the instalments of malt.

It will be understood that the floor sections are supported by legs 65 of any suitable construction.

From the foregoing description it will be seen that ventilation of the malt in the kiln compartment is secured by causing air to pass upward through the malt, and that such air may be taken directly from the attemperator room, from outside of the building, or may be a mixture of air from both sources; also that the ventilation of the malt may be continued without substantial interruption notwithstanding the removal from time to time of portions thereof. In practice a cart is run into the compartment between the stationary floor sections and the malt shoveled into it.

That which I claim as my invention and desire to secure by Letters Patent is,—

1. A malt-house having one or more germinating compartments provided with perforated floors, said floors having ducts thereunder, means for supplying fresh air to said germinating compartments above the malt therein, a withering kiln adjacent to said germinating compartments, said withering kiln having a perforated floor and a duct under said floor, means for supplying said kiln with grain from said germinating compartments, and means for causing air to flow in an upward direction through the malt in said kiln.

2. A malt house having one or more germinating compartments, means for supplying fresh air thereto, a withering kiln, means for causing air to flow in an upward direction through the malt in said kiln, said kiln having removable floor sections, and means for maintaining ventilation of the malt after certain floor sections have been removed.

3. The combination with one or more germinating compartments having perforated floors and ducts under said floors, of a kiln above said germinating compartments, said kiln having a perforated floor and a duct under said floor, means for admitting fresh air to the germinating compartments above the malt therein, means for admitting air to the duct below the kiln floor, and means for regulating the temperature and moisture of the air supplied to said germinating and kiln compartments.

4. In a malting apparatus, a compartment having a perforated floor and a channel under said floor, and means for varying the operative area of said channel and causing fresh air admitted thereto to pass in an upward direction through the malt notwithstanding variation of the operative area of said channel.

5. In a malting apparatus, a compartment having a floor provided with one or more removable sections, a lateral section or sections coöperating with said removable section or sections, said floor having a duct thereunder, one or more transverse partitions under said lateral section or sections, and a movable partition adapted to coöperate with said transverse partition or partitions to close one end of the duct under said floor.

6. In a malting apparatus, a compartment having a floor composed of stationary marginal sections and removable intermediate sections, transverse partitions under said stationary sections, and a movable partition adapted to coöperate with said stationary partitions.

WILLIAM H. PRINZ.

Witnesses:
JOHN L. JACKSON,
WILLIAM H. DE BUSK.